Patented June 18, 1935

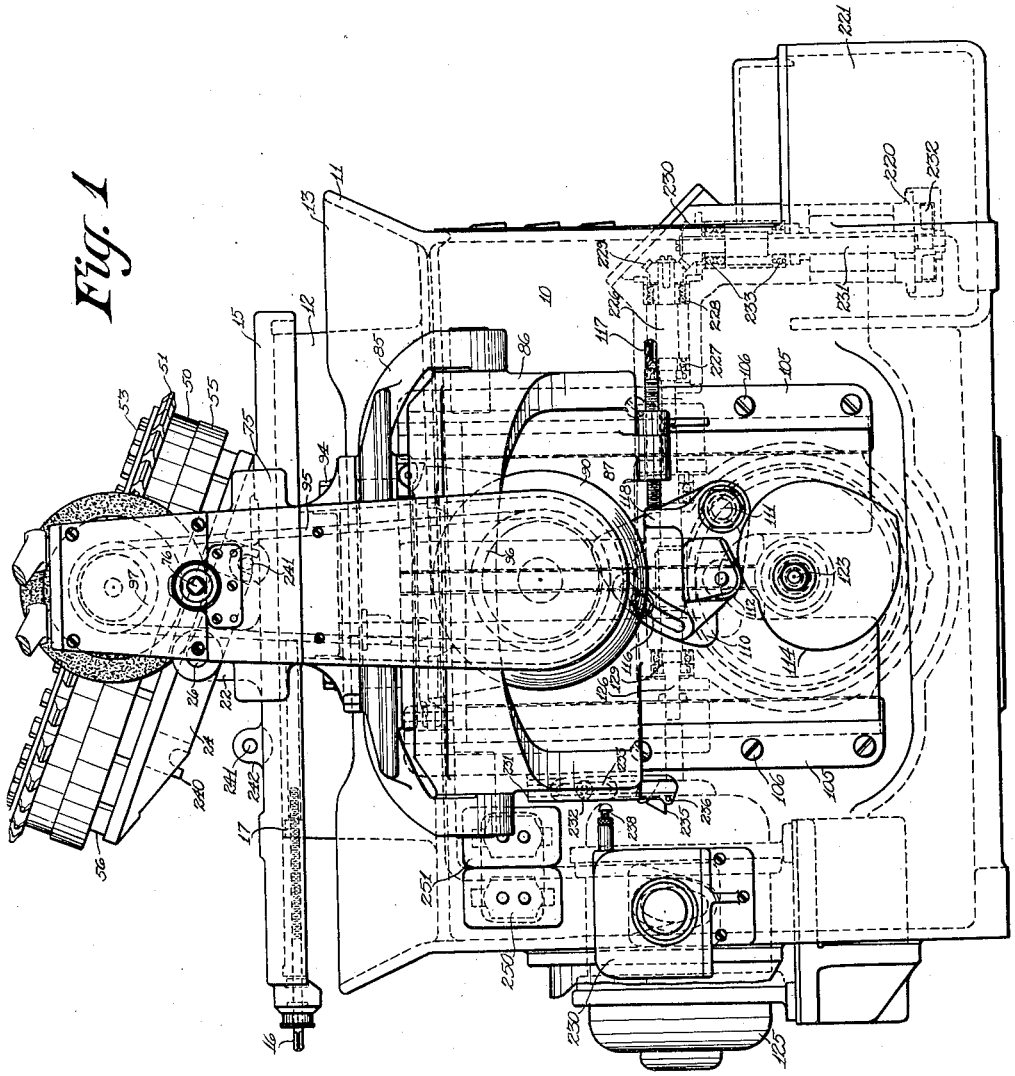

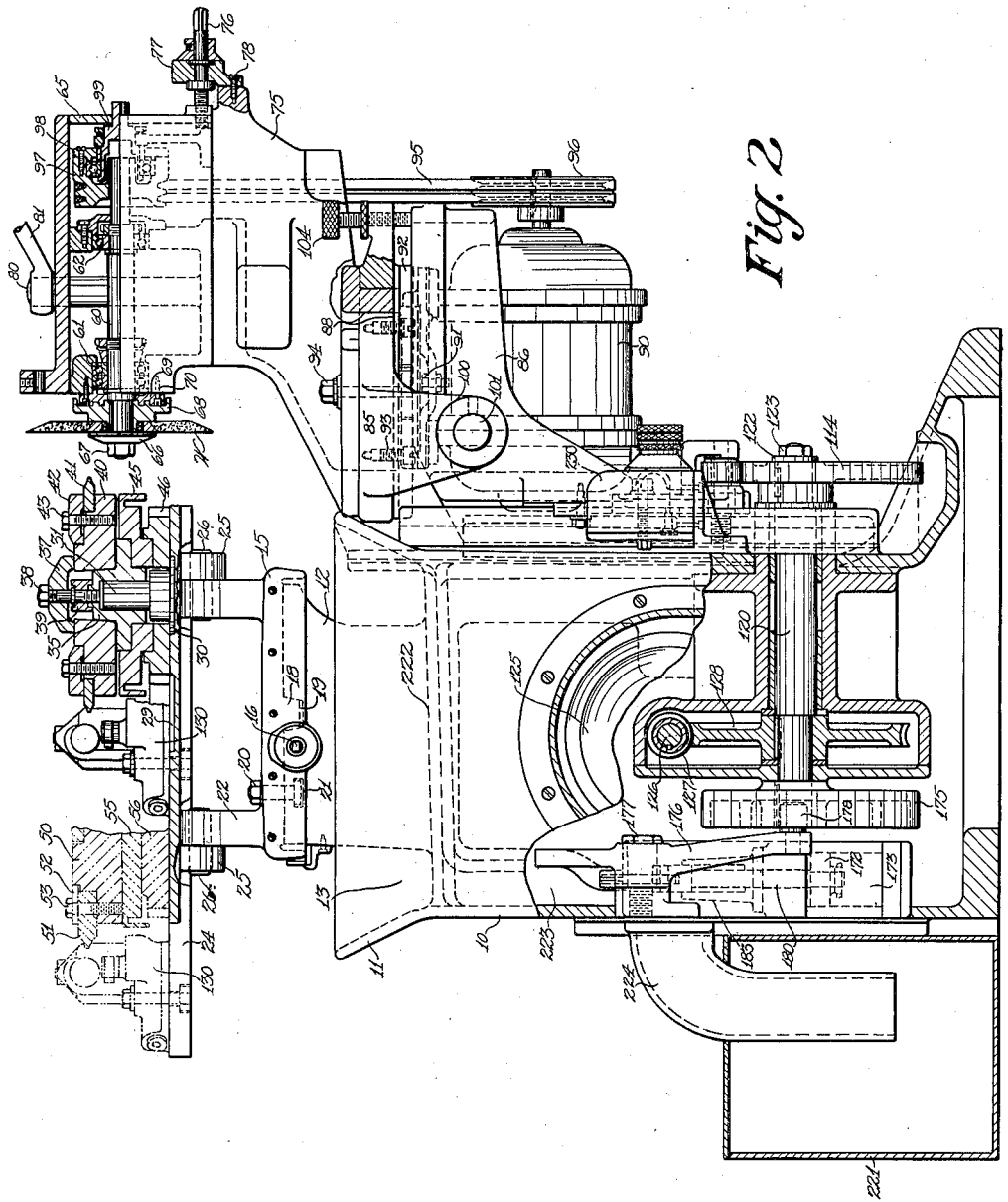

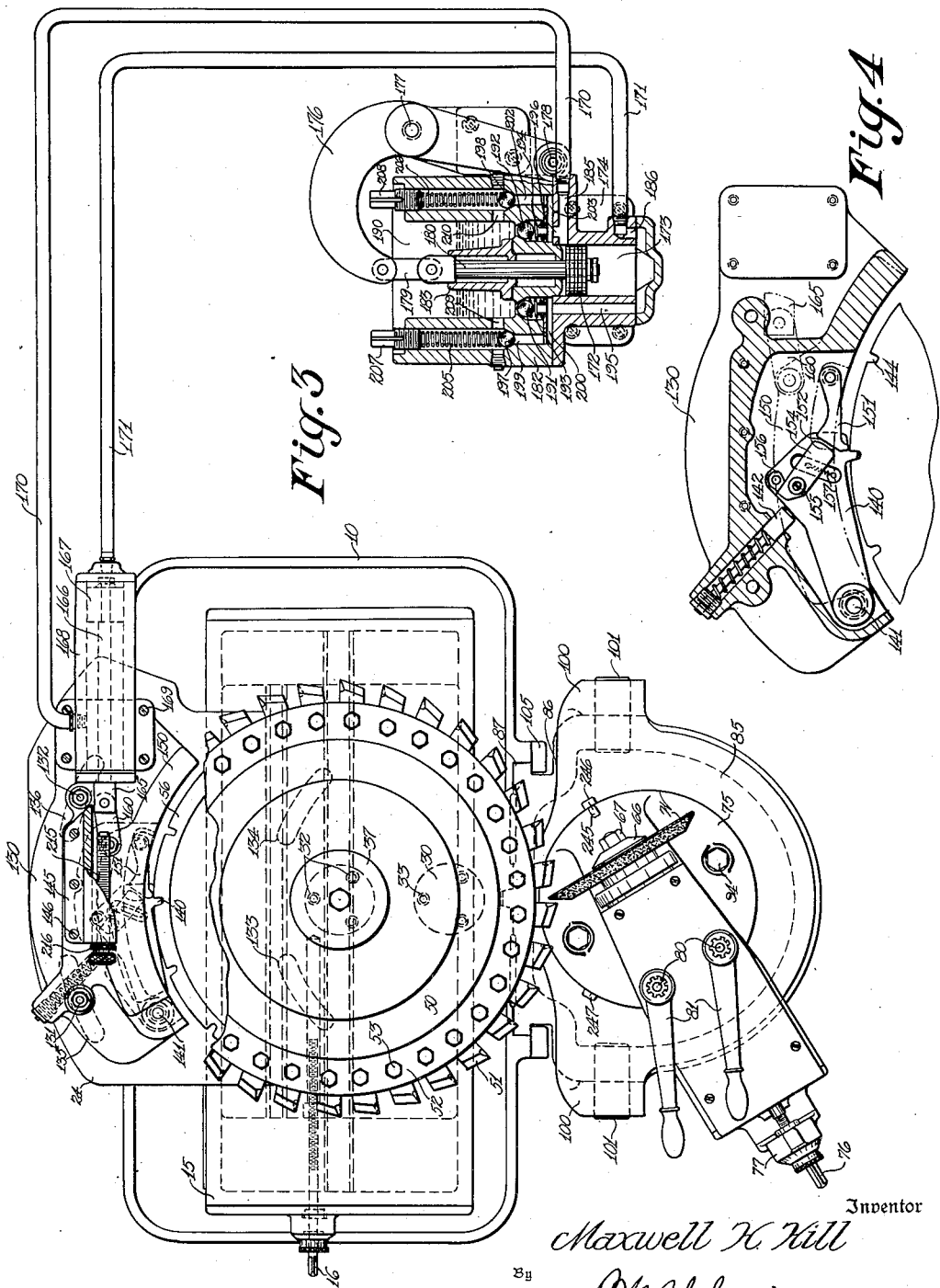

2,005,142

UNITED STATES PATENT OFFICE 2,005,142

CUTTER SHARPENER

Maxwell H. Hill, Rochester, N. Y., assignor to Gleason Works, Rochester, N. Y., a corporation of New York Application December 8, 1932, Serial No. 646,270

6 Claims. (Cl. 51—225)

The present invention relates to machines for sharpening cutting tools and particularly to machines for sharpening rotary milling cutters such as are used in rough-cutting straight bevel gears.

The primary object of the present invention is to provide a disc-cutter sharpener which will be simpler in construction and simpler and faster in operation than machines heretofore built for the purpose and which at the same time can be used to sharpen cutters in a wet-grinding operation.

Still another object of the invention is to provide a machine which can be changed over quickly to permit sharpening cutters of different sizes and, in this connection, it is a further purpose of the invention to provide a cutter sharpener having a notched-plate type of index mechanism, in which the same index-actuating and locking parts may be employed regardless of the size of the cutters to be sharpened and of the index plates used in their sharpening.

Further objects of the invention are to provide a disc-cutter sharpener in which the grinding operation is effected by a reciprocating movement of the grinding wheel, in which each stroke of the grinding wheel is of such length as to carry the wheel clear of the cutter being ground, in which the cutter is indexed while the cutter is clear of the wheel, and in which simple and compact means are provided for effecting in timed relation the reciprocation of the grinding wheel and the indexing of the cutter.

Other objects of the invention are to provide a fluid-pressure operated mechanism, and particularly the index mechanism of the present sharpener, that may be operated as part of a closed hydraulic system with which is incorporated simple means for compensating for variations in volume or pressure in the system.

Other objects of the present invention will be apparent hereinafter from the specification and from the recital of the appended claims.

In the drawings:

Figure 1 is a side elevation of a cutter sharpener built according to a preferred embodiment of this invention, the grinding wheel and its supporting and operating parts being shown swung around to an inoperative position;

Figure 2 is another elevational view of the machine but taken at right angles to the view of Figure 1, parts of the machine being broken away and the grinding wheel and associated mechanisms again being shown in inoperative position. This view shows in full lines the position which a cutter of smaller diameter than the cutter shown in Figure 1 would occupy when being sharpened and indicates in dotted lines the position which the larger diameter cutter of Figure 1 would occupy were it being sharpened. The corresponding positions of the indexing mechanism when the two cutters are being sharpened are indicated in full and in dotted lines, respectively;

Figure 3 is a view showing the cutter grinding wheel and index mechanism in plan and showing diagrammatically the connection between the index mechanism and the hyraulic control valve therefor, the valve being shown in section and the grinding wheel and its support being shown approximately in operative position; and Figure 4 is a fragmentary view showing part of the index mechanism in plan.

In the machine shown in the drawings, the grinding wheel is mounted upon a vertically movable slide which is reciprocated by a rotary cam to pass the grinding wheel across the faces of the blades of the cutter to sharpen the same. The cutter is mounted upon a rotatable head or support that is indexable to bring different blades of the cutter successively into position for sharpening. The indexing operation is effected through rotation of a notched index plate by a pawl that is connected to a piston which is reciprocable by fluid-pressure. The movement of this piston is controlled from a second reciprocable piston that is operated by a rotary cam. The two pistons form parts of a substantially closed hydraulic system which is kept filled with liquid by atmospheric pressure. This system is so arranged that, when the second piston is moved by its cam, this movement is transmitted through the hydraulic motive fluid to the first piston. Thus, as the second piston is moved in opposite directions, the index mechanism will be actuated or reset, depending upon the direction of movement of the second piston. The cam for reciprocating the grinding wheel support and the cam for operating the index control piston are mounted upon the same shaft and these cams are preferably so made that in each revolution of the shaft, the grinding wheel is passed back and forth across the face of a blade of the cutter and then the cutter is indexed. The stroke of the grinding wheel support it long enough to carry the grinding wheel clear of the cutter so that the indexing can take place without damage to the wheel or cutter.

The indexing mechanism is of the notched plate type and the locking-dog, indexing pawl and actuating piston are mounted upon a bracket that can be detachably secured in different positions on the workhead of the machine to cooperate with different sized index plates.

Mechanism is provided for automatically stopping the machine when the sharpening operations on the blades or on a group of blades for cutting one side of a tooth space of a gear blank have been completed. The machine has, of course, the necessary adjustments to bring the wheel and work into operative relation.

Referring to the drawings by numerals of reference, 10 designates the base or frame of the machine. The base is formed at its upper end with an integral skirt 11 and with an integral table 12 that extends upwardly above the skirt. The skirt is so spaced from the side walls of the table as to provide a trough 13 which is adapted to receive the coolant after use, if the machine is employed as a wet-grinder.

There is a carriage 15 mounted on the table 12 and adjustable longitudinally thereon by means of the screw-shaft 16. This screw-shaft is mounted in the carriage 15 and threads into a lug 17 (Figure 1) formed integral with the table. The carriage 15 is guided in its movement by a tongue 18 which is formed on its under surface and which engages in a complementary shaped groove 19 in the upper face of the table. The carriage is secured in any adjusted position by T-bolts 20 whose heads engage in a T-slot 21 which is formed in the upper face of the table 11 and extends longitudinally thereof in parallelism with the groove 19 and screw-shaft 16.

Integral lugs 22 project upwardly from the carriage 15 at either side thereof. There is a plate 24 pivotally mounted on the carriage 15. This plate 24 has a pair of integral ears 25 depending from its lower face and the plate 24 is pivotally mounted upon the carriage 15 by means of the pins 26 which connect the ears 25 and lugs 22. The plate 24 serves as a support for the cutter to be sharpened, as will be described more particularly hereinafter.

The machine illustrated in the drawings is designed specifically for the grinding of disc-milling cutters such as are commonly employed in the rough cutting of straight tooth bevel gears. There are two sizes of these cutters commonly in use and the machine illustrated has been designed so that it will sharpen both sizes of cutters, making it possible to grind on one machine cutters for which heretofore two machines would have been required.

The plate 24 has two circular recesses or sockets 29 and 30 formed in its upper face and the post or center 31, that is adapted to carry the cutter, which is to be sharpened, can be secured by screws 32 in either one of these sockets, depending upon the diameter of the cutter to be sharpened. The screws 32 thread into holes 33 in the face of the plate 24.

The cutter to be sharpened, whether it be of large or small diameter is mounted upon an arbor 35 and this arbor in turn is mounted upon the post or center 31. The arbor 35 has a tapered nose which is adapted to enter the bore of the cutter head and the cutter head is clamped to the arbor by a clamping-washer 37 which is secured in position by a bolt 38 that threads into the center or stud 31. 39 designates a disc or washer which may be mounted upon the bolt 38 to serve as a center for an arm that carries a gage for testing the radial positions of blades secured in the cutter head. This gage forms no part of the present invention and has not been illustrated.

In Figure 2, the post or center 31 is shown in the position it occupies when a cutter of small diameter is to be sharpened. In the drawings the cutters shown are of the inserted blade type, but it will be understood that the machine can be used just as well for sharpening cutters whose blades or cutting teeth are integral with the head. The small diameter cutter shown in Figure 2 includes the cutter head 40, the removable cutting blades 41, and the ring 42 and bolts 43 which secure the cutting blades in position on the head. When such a cutter is being sharpened, a guard plate 45 and a notched index plate 46 both of a diameter approximately the same as that of the cutter are used. The guard plate 45 is removably secured to the arbor 35 by screws or other suitable means (not shown) and the index plate 46 is likewise removably secured to the guard plate 45 by screws or other suitable means (not shown).

In Figures 1 and 3, I have shown the center 31 in the position it occupies when a large size cutter is to be ground and we have shown a large size cutter being ground. The position of the large size cutter is shown also, for the sake of comparison, fragmentarily in dotted lines in Figure 2. The large size cutter comprises the cutter head 50, the inserted cutting blades 51 and the ring 52 and the bolts 53 which serve to clamp the ring and blades in position. When a large size cutter is to be ground, the index plate 46 and the guard plate 45 are taken off the arbor 35 and a guard plate 55 and index plate 56 corresponding approximately in diameter to the diameter of the large cutter are secured instead to the arbor and the post or center 31, having been lifted out of the socket 30 is secured in the socket 29.

Cutters are sharpened on the present machine by grinding the front faces of the cutting blades. The grinding wheel W used for sharpening is clamped by a washer 66 and bolt 67 on a disc or plate 68 that is keyed to a spindle 60 which is journaled by means of anti-friction bearings 61 and 62 in an adjustable head 65. The disc or plate 68 cooperates with a disc 69 to provide a labyrinth seal for the front bearings 61. The disc 69 is secured to the head 65 by screws 70.

The head 65 is slidably adjustable upon a carrier 75, the adjustment being effected by rotation of the screw shaft 76 which is journaled in a bearing member 77 that is secured to the carrier 75 by screws 78. The shaft 76 threads into the head 65. The head slides rectilinearly in its adjustment on the carrier 75 and can be secured in any adjusted position by T-bolts 80 which pass through the head 65 and engage in longitudinal T-slots formed in the upper face of the carrier 75. The T-bolts 80 are manipulated by the levers 81. The carrier 75 is rotatably adjustable upon a bracket 85 that is in turn pivotally mounted upon the projecting arm 86 of a slide 87. This arm is of approximately semi-circular or U-shape as clearly shown in Figure 1 and is integral at its two ends with the body of the slide 87.

The bracket 85 has a central opening extending therethrough. The carrier 75 is formed with a flange that seats against the upper face of the bracket 85 and with an integral collar 88 that fits into this opening. Thus the carrier 75 is rotatably adjustable on the bracket 85. The motor 90 which is employed to drive the grinding wheel spindle 60 is secured by bolts 91 to a plate 92 which, in turn, is secured by bolts 93 to the collar 88. The plate 92 seats against the underface of the bracket 85. The motor lies beneath the bracket 85 and the arm 86 of the slide 87 extends around it. The carrier 75 is secured in any position of its angular adjustment on the bracket 85 by bolts 94 which are mounted in the carrier 75 and thread into the plate 92, the plate being provided with saw-slots at either side of each bolt so that, when the bolts are threaded up, they exert a binding action on the plate.

The motor 90 drives the grinding wheel spindle 60 through a belt 95 which runs on the pulley 96 that is secured to the armature shaft of the motor and on the pulley 97 which is keyed to the shaft 60. The pulley 97 is journaled on anti-friction bearings 98 on a bearing member 99 that is secured in the head 65.

The bracket 85 is provided with dependent arms 100 which carry pins 101 that engage in the arm 86 of the slide 87 and form a pivotal support for the bracket 85. The bracket 85 is adjusted angularly about the pins 101 by the screw 104 which threads into the bracket 85 and contacts the upper face of the arm 86.

The slide 87 is reciprocable upon the frame 10 of the machine for the purpose of carrying the grinding wheel W across the front faces of the blades of a cutter to sharpen the same. The slide 87 is held on the frame by the plates 105 which are secured to the frame by screws 106.

The slide 87 carries a plate 110 which is pivotally mounted upon a stud 111 that is threaded into the slide 87. This bracket carries a roller 112 which is adapted to engage the periphery of a rotatable heart-shaped cam 114. The roller 112 is adjusted into contact with this cam, after bolt 116 is released, by rotation of the screw 117 which is secured to the bracket 10 and which threads into a boss 118 that is formed integral with the slide 87. The bolt 116 passes through an arcuate slot 119 formed in the bracket 110 concentric to the bolt 111 and by tightening the bolt 116, the bracket 110 can be secured to the slide 87 against movement relative thereto.

The cam 114 is keyed to a shaft 120 that is journaled in the frame 10 of the machine, the cam being held on this shaft by the washer 122 and the bolt 123. The shaft 120 is driven by the motor 125 which is suitably mounted in the frame of the machine. The worm shaft 126 is suitably coupled to the armature shaft of this motor and to this worm shaft 126, there is keyed a worm 127 which meshes with a worm-wheel 128 that is keyed to the shaft 120. The worm shaft 126 is journaled on anti-friction bearings 129 (Figure 1) in the frame of the machine.

The heart-shaped cam 114 is so formed that the grinding wheel on each reciprocation of the slide 87 will be moved clear on the cutter head. During the period that it is clear of the cutter head, the cutter head is indexed so that a new blade of the cutter is brought into position to be ground on the next stroke of the grinding wheel. The index mechanism for the cutter head will now be described.

130 designates a bracket which can be secured upon the plate 24 in two different positions. When a small diameter cutter is being ground and the center 31 is secured in the socket 30, the bracket 130 is secured to the plate 24 by passing the bolts 131 and 132, respectively, through the arcuate slots 133 and 134 which are formed in the plate 24 concentric of the socket 30. When a large cutter is to be sharpened, the bracket 130 is secured to the plate 24 by passing these same bolts 131 and 132 through the arcuate slots 135 and 136, respectively. These slots 135 and 136 are formed concentric of the socket 29. In Figure 2, we have shown in full lines, the position of the bracket 130 when a small size cutter is being ground, while the position of this bracket, when a large diameter cutter is being sharpened is shown in dotted lines.

The index locking-dog 140 is carried by the bracket 130. This dog is pivotally mounted upon a stud 141 that is secured in the bracket and it is constantly urged forward and into locking position by a spring pressed plunger 142 which is housed in a hole drilled in the bracket 130. The same locking dog is used for both the small size index plate 46 and the large size index plate 56. The notches in the two index plates are of the same size. Ordinarily cutters used for cutting straight tooth bevel gears have alternate cutting blades sharpened with opposite side-cutting rakes so as to provide cutting edges on alternate blades which cut opposite side tooth faces of a gear blank. Such cutters have been illustrated in the drawings and for sharpening such cutters, the index plates used need have only half as many notches as there are blades in the cutter head. One set of blades will be sharpened with the plate 24 tilted in one direction about the pins 26 and the other set of blades will be sharpened with the plate 24 tilted in the other direction.

There is a cover-plate 145 secured to the bracket 130 by screws 146 and between this plate and the bracket is mounted an arm 150. The shape of this arm is clearly shown in dotted lines in Figure 4. The cover-plate 145 and the bracket 130 are shaped to provide a guide for this arm so that, as it reciprocates, it will swing about the center 31.

On the under-side of the arm 150 there is pivotally mounted the index pawl 151. The pawl 151 normally rests on the periphery of the index plate being used at a slight angular distance from that notch of the index plate with which the dog 140 is in engagement (see Figure 4). The pawl is formed with a flat cam surface 152. 154 designates a dog which is pivotally mounted by means of the pin 155 on the lock-dog 140 but which is held against movement in one direction about its pivot pin 155 by a stop-lug 156 which is suitably secured to the lock-dog 140. As the arm 150 is moved to the left from the position shown in Figure 4, the cam surface 152 of the pawl 151 engages the tip of the dog 154. The dog 154 is held against pivotal movement by the stop-lug 156. Therefore, the lock-dog 140 is swung up out of locking position against the resistance of the spring plunger 142. When the pawl 151 has moved far enough to the left to register with that notch 144 of the index plate from which the lock-dog 140 has just been disengaged, the pawl 151 drops into that notch. The spring-plunger 142, acting through the lock-dog 140 and trip-dog 154, forces the pawl into engagement with the notch. In the further movement of the arm 150 to the left, the pawl is maintained by friction in engagement with the notch of the index plate. As the arm 150 moves on to the left, therefore, the pawl rotates the index plate, thus indexing the cutter.

When the arm 150 has moved through a sufficient angle, the locking-dog 140, which will have been riding on the periphery of the index plate, will drop into engagement with the next notch of the plate, thus locking the plate up again. At this instant, the arm 150 will be reversed. In the return movement of the arm, the pawl 151 will ratchet out of the notch of the index plate with which it has been engaged and will return to its normal position shown in Fig. 4, the dog 154 being rocked out of the way against the resistance of the coil spring 157, which is attached at one end to the dog 154 and on its other end to the locking-dog 140.

The arm 150 is reciprocated by fluid-pressure. To this end, the arm is connected by a link 160 with the head 165 of a piston rod 166 which is secured to a piston 167. This piston 167 reciprocates in a cylinder 168 which is secured to the bracket 130 by screws 169.

The motive fluid, such as oil, is admitted to opposite sides of the piston 167 through pipes 170 and 171 that thread into the cylinder 168.

The direction of application of the pressure fluid to the piston 167 is controlled by a reciprocable piston or plunger 172. This piston is mounted to slide in the bore 173 of a casing 174 that is secured in the base of the machine, see Figure 2.

The piston 172 is reciprocated by a rotary face-cam 175 which is keyed to the shaft 120. There is a bell-crank arm 176 pivotally mounted by means of the pin 177 upon the frame of the machine. On one end of this arm there is carried a roller 178 that engages in the track of the cam 175. At its other end the arm 176 is connected by the link 179 with the piston-rod 180 to which the piston 172 is secured. The rod 180 extends upwardly through the cover-plate 182 of the casing 174 and through a sleeve or thimble 183 that is suitably secured to this cover-plate.

The pipe lines 170 and 171 thread into the casing 174, communicating, respectively, with ducts 185 and 186 formed in the casing. The lines 170 and 171 constitute with the cylinder 168, in which the pitson 167 slides, and the bore 173, in which the piston 172 slides, a normally closed hydraulic system. Thus, when the piston 172 is forced downwardly in the bore 173 by operation of the cam 175, the fluid in the lower end of the bore 173 is forced out of the bore through the duct 186 and pipe line 171 into the right end of the cylinder 168, forcing the piston 167 to the left in its cylinder and the fluid forced out of the left end of the cylinder will flow through the line 170 and duct 185 into the bore 173, occupying the space above the now-lowered piston 172.

Leakage from this system is, however, liable to occur and, too, excessive pressure might be built up in the system were the effective operating faces of the piston 172 and piston 167 and the dimensions of the cylinder 168 and bore 173 not properly balanced so that in either position of the piston 172, the same amount of oil could be contained in the system. Through an ingenious arrangement, which will now be described, the system can be replenished if leakage occurs and the building up of excessive pressure in the system is prevented.

The cap or cover-plate 182 of the casing is so formed as to provide a central well or reservoir 190. This reservoir is filled with oil up to a point just below the top of the sleeve or spindle 183, as shown in Figure 3 of the drawings. The system is normally closed against flow of oil from the reservoir into the bore 173 by a pair of ball check-valves 191 and 192. The valve 191 is held closed by spring 193 and the valve 192 is held closed by spring 194.

When pressure in the system falls below a predetermined minimum, the valves 191 and 192 are opened by atmospheric pressure and by the weight on them of the column of oil in the reservoir 190 and by the suction exerted by the piston or plunger 172 as it moves in opposite directions. When the piston 172 moves upwardly, oil can be drawn into the system from the reservoir through the valve 191 and the duct 195, and when the piston 172 moves downwardly oil can be drawn into the system from the reservoir through the valve 192 and ducts 196 and 185. Thus leakage in the system is replenished.

Relief valves 197 and 198 are provided to prevent building up of excessive pressures in the system. The valve 197 closes the duct 199 that communicates with the duct 200 which leads from the duct 195. The valve 198 closes the duct 202 which communicates with the duct 196 through the duct 203. The valves 197 and 198 are normally held closed by the coil springs 205 and 206, respectively. The tension of these springs, respectively, can be adjusted by threading up the screws 207 and 208.

Excess oil can, therefore, be discharged from the system, in the reciprocation of the piston 172, through either the valve 197 or 198. When the valve 197 is opened, the oil is discharged from the duct 199 through the duct 209 into the reservoir 190, while when the valve 198 is opened, the fluid in the system is discharged from the duct 202 through the duct 210 into the reservoir 190.

The stroke of the piston 167, which determines the amount of angular movement of the index plate for indexing, is adjusted by adjustment of the stop-screw 215 (Figure 3). This screw threads into the cover plate 145 of the bracket 130 and is adapted to contact with the head 165 of the piston rod 166 to limit the movement of the piston rod to the left. A lock-nut 216 is provided to secure the stop screw 215 in any adjusted position.

For wet grinding, the machine is provided with a pump 220, which may be of any suitable construction and which is suitably mounted in the base of the machine (Figure 1). This pump pumps the water or other coolant from the sump or tank 221 through suitable piping (not shown) to the cutter at the point of engagement of the grinding wheel with the cutter.

The tank or sump 221 is suitably secured to the frame of the machine at one side thereof. The coolant falling off the cutter and grinding wheel drops into the trough 13. This trough is formed with an inclined bottom 222 that slopes toward one side of the machine and the trough is drained by a duct 223 which leads from the low side of the trough. The duct 223 connects with a discharge-spout 224 that discharges the used coolant back into the sump 221. It may there be settled and strained as in the usual practice in wet-grinders.

The pump 220 is driven from the shaft 126 (Figure 1). There is a shaft 226 aligned with the shaft 126 and suitably connected thereto. This shaft 226 is mounted upon anti-friction bearings 227 and 228 in the frame of the machine. To this shaft 226 there is secured a bevel pinion 229 which meshes with the bevel gear 230 that is secured to the vertical shaft 231 which carries the impellor or paddle 232 of the pump 220. The vertical shaft 231 is journaled in the frame of the machine on antifriction bearings 233.

An automatic stop may be used upon the machine to stop the machine when sharpening operations on a set of blades have been completed. Such a stop is shown at 230 in the drawings (Figures 1 and 2). The stop may be of any suitable type. That shown is of the same construction as the stop described and claimed in the pending application of George E. Ford, Serial No. 441,694, filed April 4, 1930.

There is a strap 231 adjustably secured to the slide 87 (Figure 1) by means of a bolt 232 which threads into the slide and which passes through an elongated slot 233 in the strap. There is a trip-dog 235 pivotally mounted at 236 upon the strap 231 but held by a stop-lug or other suitable means against pivotal movement in one direction on its pin. Each time that the slide 87 moves upwardly, the trip-dog 235 will strike the plunger 238 of the stop 230, ratcheting the stop mechanism forward. On the down stroke of the slide 87, the trip-dog 235 kicks out of the way without operating the plunger 238, for it pivots about its pivot-pin 236.

When a bevel gear cutter of the usual type is being sharpened, the stop mechanism 230 is initially adjusted to trip after half the number of the blades in the cutter head have been sharpened, that is, after all the blades for cutting one side tooth surface of a gear blank have been ground. When the automatic stop is tripped the motor 125 with which the stop is in circuit is stopped.

In the use of the machine, the center 31 is secured by the screws 32 in one or other of the sockets 29 or 30, depending upon whether a small or a large size cutter is to be sharpened. A small size index plate 46 and a small guard plate 45 or a large size index plate 56 and a large guard plate 55 are then slipped onto the center 31 depending upon the size of the cutter to be sharpened. The arbor 35 is then placed upon the center 31 and secured to the guard plate. The cutter to be sharpened is then clamped on the arbor by the disc 37 and bolt 38. The plate 24 is tilted angularly about the pivot pins 26 to one side or the other, depending upon which group of side cutting blades is to be sharpened first. The plate 24 carries on its under face a pair of spaced stop-lugs 240 (Figure 1). These stop lugs engage pins 241, that are secured in ears 242 formed integral with the carriage 15, to limit the angular tilting movement of the plate 24 in both directions so that the desired amount of side rake will be ground on the blades of the cutter.

The carriage 15 is adjusted on the table 12 by means of the screw 16 to bring the cutter into position to permit grinding back the blades to the desired depth. The grinding wheel is secured on the spindle 60 and the grinding wheel head 65 is adjusted longitudinally on the carrier 75 to bring the grinding wheel into operative relation with the blades. The amount of this adjustment will depend upon the extent to which the wheel and the blades have been worn back by repeated use. The carrier 75 is adjusted angularly on the bracket 85 so as to grind the blades with the proper hook or drag. In the bevel gear field, the front faces of the blades of the cutter have a standard inclination from their tips to their roots and the carrier 75 may therefore be adjusted by bringing the line 245 inscribed on the carrier into registry selectively with one of two lines 246 or 247 inscribed on the upper face of the bracket 85. In a more universal machine built according to the present invention, the upper surface of the carrier 75 or of the bracket 85 might be graduated to read against a zero mark on the other part.

The bracket 85 is then adjusted angularly on the slide 87 by the adjusting screw 104, if a change of setting is desired to dispose the grinding wheel symmetrically of the front faces of the blades being ground. The stop screw 215 (Figure 3) is then adjusted to limit the amount of indexing movement of the pawl 151.

When all of these adjustments have been made, the machine is ready for use and the operator starts the wheel drive motor 90 by pressing in the start button of a combination start and stop button 250 (Figure 1). As soon as the wheel is rotating, he presses in the start button of a combination start and stop button 251 to start the main drive motor 125. The wheel drive motor drives the grinding wheel spindle 50 through the belt 95 and pulleys 96 and 97, as described. The main drive motor 125 drives the shaft 120 through the worm 127 and worm wheel 128. This rotates the cams 114 and 175 simultaneously.

The cam 114 reciprocates the slide 87, carrying the grinding wheel across the faces of the blades of the cutter. At one end of the stroke of the slide 87, when the grinding wheel is clear of the cutter, the cam 175 will rock the lever arm 176 (Figure 3) to cause an indexing movement to be imparted to the indexing pawl 15. In Figure 3, the arm 176 is shown in position just prior to the indexing movement. As this arm is rocked from the position shown, the piston 172 is forced downwardly in the bore 173, forcing the oil in the lower end of the bore out through the line 171 into the right end of the cylinder 168 to force the piston 167 to the left. The oil in the left end of the cylinder 168 flows out of the cylinder through the line 170 into the upper end of the bore 173 above the descending piston 172. If there is an excess of oil in the system, the relief valve 193 is opened by the pressure in the system and the excess of oil flows out into the reservoir 190 through the duct 210. If there has been leakage from the system, the system is replenished from reservoir 190 through opening of the valve 192 by air pressure, gravity, and the suction exerted by the downwardly descending piston 172.

The movement of the piston 167 to the left, as just described, causes the pawl 151 to engage the dog 154 and force the locking-dog 140 out of locking position. The pawl 151 then drops into engagement with the index plate and rotates the index plate through the angle required for indexing. The locking-dog 140 will ride on the periphery of the index plate during this movement and when it comes into registry with the next notch of the plate will drop into engagement therewith, locking the index plate up again.

The cams 114 and 175 will be so shaped relative to one another that as soon as the indexing operation is completed, the slide 87 will be in position in its movement to carry the grinding wheel across the face of the new blade which has been indexed into sharpening position. During the passage of the grinding wheel back and forth across this blade, the parts of the index mechanism will be returned to initial position by reversal of the piston 172 under actuation of the cam 175. The cam causes the arm 176 to be swung again to the position shown in Figure 3, pulling the piston 172 upwardly and forcing the oil in the bore 173 above the piston out of the bore 173 through the line 170 into the right end of the cylinder 168. This forces the piston 167 back to the right in the cylinder, pulling the arm 150 and the pawl 151 back to the right. In this movement to the right, the pawl 151 ratchets idly over the index plate and simply kicks the dog 154 out of the way against the resistance of the spring 151. The oil forced out of the right end of the cylinder 167 flows back through the line 171 into the lower end of the bore 173, filling up the bore behind the ascending piston 172. If there is an excess of oil in the system, the valve 197 is opened by the pressure and the excess oil flows out through the duct 209 into the reservoir 190. If there has been leakage from the system, the system is replenished from the reservoir 190 through the valve 191 which is opened by atmospheric pressure, gravity and the suction exerted by the ascending piston or plunger 172.

The machine operates, therefore, to pass the grinding wheel back and forth once across the front face of a blade of the cutter and then the cutter is indexed to bring a new blade into position. An indexing operation occurs, in other words, after each reciprocation of the grinding wheel slide. The cam 175 might be formed, however, so as to index the cutter at both ends of the stroke of the grinding wheel slide.

If one passage of the grinding wheel back and forth across the blade is considered sufficient to sharpen the blades, the automatic stop 230 can be set to operate after the grinding wheel has been passed across the faces of all of the blades cutting on the same side, namely, after the cutter head has been indexed through one revolution. If more passages of the grinding wheel across the faces of the blades are required to sharpen the blades, the automatic stop will be set accordingly. When one set of blades has been sharpened, the operator tilts the cutter head on the pins 26 to bring the blades of the other set into position for sharpening. When these blades have been sharpened, the cutter will have been ground.

The automatic stop may be adjusted so as to stop the motor 125 when the grinding wheel is entirely clear of the cutter head so as to facilitate quick removal of one cutter from the machine and placing of another.

While the invention has been described in connection with the sharpening of a particular type of cutter and in a particular manner, it will be understood that in its broader aspects, the invention is not limited to this particular use or construction. This application is intended to cover any adaptation, use, or embodiment of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for sharpening cutters, a frame, a tool support reciprocable vertically on the frame, a carrier adjustable angularly on said tool support, a tool head adjustable rectilinearly on said carrier in a direction at right angles to the axis about which said carrier is adjustable, a grinding wheel journaled in said tool head, a carriage adjustable rectilinearly in a horizontal plane on the frame, a work support adjustable angularly on said carriage about a horizontal axis, a work arbor rotatably mounted on said work support and adapted to carry the cutter to be sharpened, means for reciprocating said tool support through a distance long enough to pass the grinding wheel across the face of a blade of the cutter and then clear the cutter, and means for rotatably indexing the work arbor when the grinding wheel is clear of the cutter.

2. In combination, a work support, a work arbor journaled therein, a notched index plate secured to the work arbor, a locking dog pivotally mounted on said work support, means constantly urging said locking dog into engagement with said notched plate, a trip dog pivotally mounted on said locking dog, means resiliently holding said trip dog against movement in one direction about its pivot and means positively limiting movement of said dog in the opposite direction, an arm movable angularly about the axis of said work arbor, a pawl pivotally mounted on said arm and formed with a cam surface adapted to engage said trip dog to move the locking dog out of engagement with the index plate on movement of said arm in one direction, means for moving said pawl into engagement with the notched plate when the locking dog is disengaged, and means for periodically oscillating said arm to index the work arbor.

3. In a machine for sharpening cutters, a frame, a work support and a tool support, one of which is reciprocable on the frame, a grinding wheel journaled on the tool support, a work head adjustably mounted on the work support, a work spindle journaled in the work head, indexing mechanism for the work spindle, means for actuating said indexing mechanism comprising a cylinder and a piston reciprocable therein, a second cylinder and a second piston reciprocable therein, and piping connecting the second cylinder with the first cylinder, said cylinders and piping constituting a normally closed hydraulic system whereby movement of the second piston in opposite directions in its cylinder causes movement of the first piston in opposite directions in its cylinder, a positive stop for limiting movement of the first piston, a reservoir, and valves connecting the hydraulic system with said reservoir to allow automatically exhaust from or supply to said system when pressure in the system rises above or falls below, respectively, a predetermined operating pressure, a shaft journaled in the frame, a pair of cams secured to said shaft, means connecting one of said cams to said tool support to reciprocate the same to pass the grinding wheel across the work, means connecting the other cam to the second piston to reciprocate the same, and means for rotating said shaft.

4. In a machine for sharpening cutters, a frame, a tool support movable on the frame, a grinding wheel journaled in the tool support, a work support mounted on the frame, a rotatable work spindle adapted to be secured on said work support selectively in a plurality of different positions at different distances from said grinding wheel, said work spindle being adapted to carry different notched index plates, index mechanism comprising means for locking said different index plates against rotation during grinding and means for rotating said different index plates, when the locking means is released, to index the work, means for securing the index mechanism in a plurality of different positions on the work support to permit cooperation of said index mechanism with index plates carried by the work spindle in different positions of the work spindle, means for actuating said index mechanism, and means for moving the tool support to effect the grinding operation.

5. In a machine for sharpening cutters, a frame, a tool support movable on the frame, a grinding wheel journaled in the tool support, a work support mounted on the frame and having a plurality of openings therein, a work spindle adapted to be secured to the work support selectively in said different openings, a member mounted on said work spindle and rotatable to index the work, means adapted to cooperate with said member to rotate the same, a bracket on which said last named means is mounted, means for securing said bracket in different positions on the work support in correspondence with different positions of location of said work spindle, means for moving the tool support to effect the grinding operation, and means for actuating said index mechanism in all of its different positions.

6. In a machine for sharpening cutters, a frame, a tool support mounted on the frame, a grinding wheel journaled in the tool support, a work support mounted on the frame and having a plurality of sockets formed therein and having a plurality of arcuate slots formed therein concentric, respectively, to the different sockets, a work spindle adapted to be secured selectively in said different sockets and adapted to carry different sized index plates, indexing mechanism adapted to cooperate with any of the index plates, a bracket on which said index mechanism is mounted, means for securing said bracket in different slots of said work support in accordance with the location of the work spindle, means for moving the tool support to effect the grinding operation, and means for actuating said index mechanism in any of its different positions.

M. H. HILL.